United States Patent [19]

Barberis

[11] Patent Number: 4,676,346
[45] Date of Patent: Jun. 30, 1987

[54] BRAKE SLACK ADJUSTING APPARATUS
[75] Inventor: Dario Barberis, Turin, Italy
[73] Assignee: WABCO Westinghouse Compagnia Freni S.p.A., Turin, Italy
[21] Appl. No.: 648,421
[22] Filed: Sep. 7, 1984
[30] Foreign Application Priority Data
  Sep. 9, 1983 [IT] Italy .................. 67936 A/83
[51] Int. Cl.⁴ .................................. F16D 65/66
[52] U.S. Cl. .................. 188/202; 188/196 D; 188/196 V; 188/199
[58] Field of Search .............. 188/196 V, 199, 202, 188/203, 196 D

[56] References Cited
U.S. PATENT DOCUMENTS
3,100,032 8/1963 Larsson ................ 188/203 X
3,850,269 11/1974 Beacon .................... 188/202

Primary Examiner—George E. A. Halvosa
Attorney, Agent, or Firm—J. O. Ray, Jr.

[57] ABSTRACT

A brake slack adjusting apparatus is disclosed which includes a threaded member at least partially extending coaxially within a tubular member. Threadedly engaging the threaded member is a first rotatable member for varying the relative position of the rotatable member with respect to the threaded rod member. A second rotatable member disposed adjacent the threaded rod member and the tubular housing member selectively couples the tubular housing member to the threaded rod member during a brake application stroke to transmit brake forces to the threaded rod member and to vary the relative axial position between the tubular housing member and the threaded rod member. A locking device is provided between the first rotatable member and the second rotatable member to limit the relative movement between the first rotatable member and the threaded rod member when a predetermined force is transmitted through the second rotatable member.

11 Claims, 2 Drawing Figures

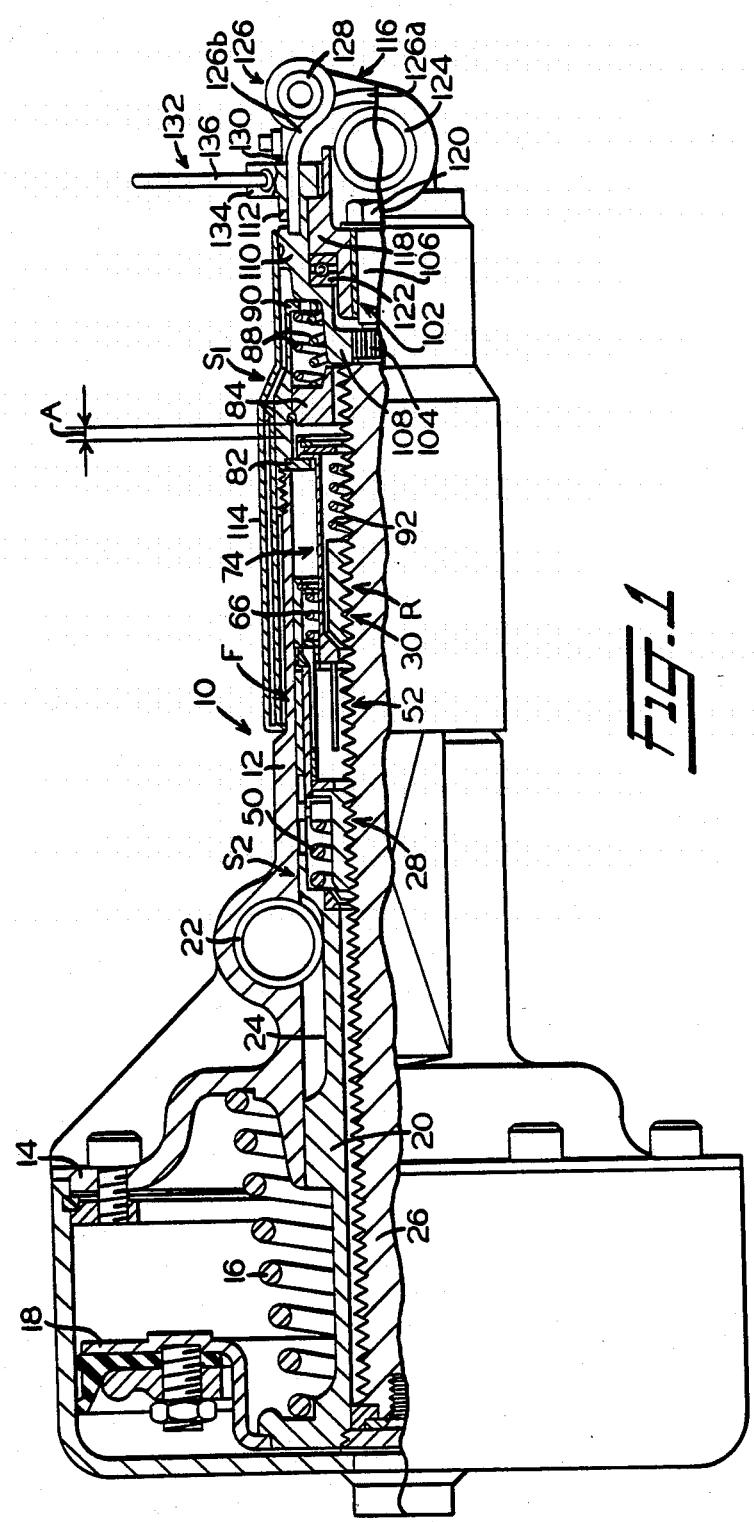

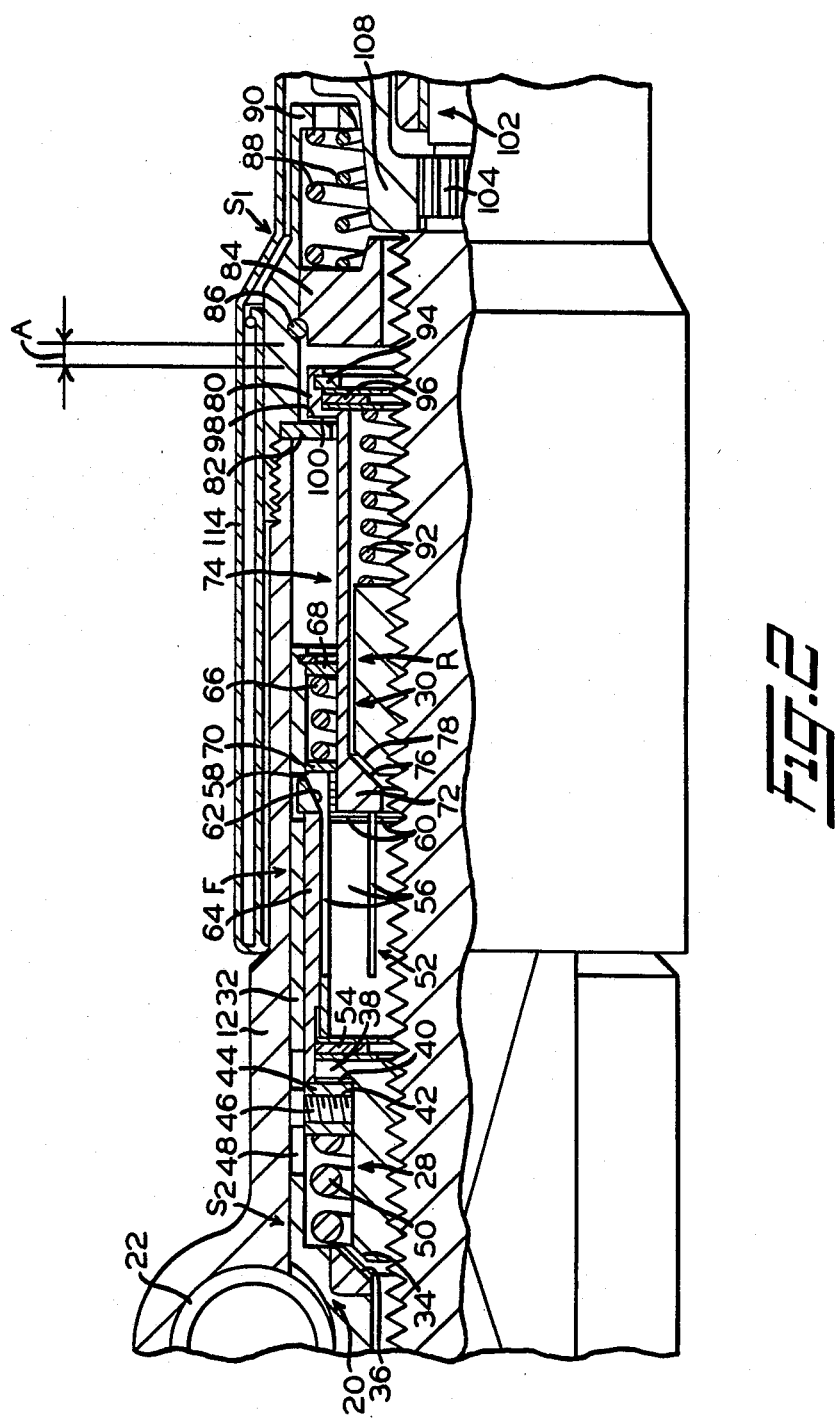

BRAKE SLACK ADJUSTING APPARATUS

BACKGROUND OF THE INVENTION

The present invention relates in general to brake actuators of railway or similar type vehicles and, in particular, the invention relates to a pneumatic actuator.

Actuators which consist of a tubular housing equipped with a cylinder at one end in which slides, under the action of a fluid under pressure and against the action of an elastic retraction means, a piston with a hollow shaft connected thereto and which does not rotate in relation to the tubular housing and in which is axially connected a threaded rod to operate the braking means, in which the rod is also nonrotating with respect to the tubular housing are known. During the braking action of the threaded rod, a clutch-type, self-adjusting mechanism changes the relative axial position of the threaded rod and the hollow shaft, as the above-mentioned braking means wear down.

According to this application, the automatic self-adjusting device consists of an internally threaded stopping ring which screws on a threaded rod and has a frontal coupling part which fits the corresponding frontal coupling part of the hollow shaft to block the rotating of the stopping device, in relation to the hollow shaft, and elastic retraction means are provided to restore the engagement of these coupling parts, by the screwing of the retaining element in relation to the threaded rod, after an axial separation between these coupling parts.

In addition, between the tubular housing and the threaded rod is placed a friction ring which acts on the threaded rod and slides together with it in relation to the housing, during the operation of the actuator, for a predetermined stroke. Limit stops are placed on the housing to stop the friction ring at the end of such predetermined stroke and to allow for an axial sliding of the threaded rod in relation to the hollow shaft, in order to adjust for any wear of the braking means.

Therefore, in this known actuator the threaded rod will slide out of the hollow shaft every time the advancement of the hollow shaft is greater than the normal brake stroke defined by the limit stops.

This overtravel may be due to the normal wearing of the braking device and also to the elastic give of the transmission elements, which connect the actuator to the brake unit. These elements generally consist of two caliper arms, one connected to the actuator housing and the other to the free end of the threaded rod, and which have a pair of friction pads adapted to a wheel of the railway or similar type vehicle.

The action to adjust for the above-mentioned play and elastic give is generally negligible and not sufficient to effect the correct operation of the actuator. However, in some particular applications, the action of the self-adjusting device to take up the play due to such elastic give is undesirable and must be eliminated.

SUMMARY OF THE INVENTION

A brake actuator and slack adjuster for vehicles is disclosed. The apparatus comprises a tubular housing in which slides a hollow shaft activated by a piston and in which is axially connected a threaded rod which operates the braking means. A clutch device is provided for the automatic adjustment which, during the braking stroke of the threaded rod, changes the relative axial position of the threaded rod and the hollow shaft as the braking means wear down. The actuator also includes disengaging elements of the self-adjusting mechanism which, when the braking force is applied, is activated by the activating means placed between the tubular shaft and the threaded rod, and an engaging mechanism to allow, when the self-adjusting mechanism is disengaged, a supplementary braking stroke of the threaded rod together with the tubular shaft.

OBJECTS OF THE INVENTION

It is, therefore, an object of the present invention to provide a brake slack adjusting device in which the action of the self-adjusting device is limited exclusively to the automatic take-up of the play and wear of the braking devices, excluding any adjustments for play and elastic give due to the coupling between the actuator and the braking devices.

This and various other objects and advantages of the invention will become more apparent to those persons skilled in the art from the following more detailed description when taken in conjunction with the attached drawings.

BRIEF DESCRIPTION OF THE DRAWINGS

FIG. 1 is a cross-sectional view along the length of a slack adjuster according to the present invention; and FIG. 2 is an enlarged view of the central portion of the slack adjuster shown in FIG. 1.

BRIEF DESCRIPTION OF THE INVENTION

The object of the present invention is achieved because the actuator according to the invention includes a mechanism to disengage the self-adjusting device which is actuated, when the braking force is applied, by actuating devices placed between the tubular shaft and the threaded rod, and engaging devices which, when the self-adjusting device is disengaged, permit an additional braking stroke of the threaded rod together with the tubular shaft.

In this manner, each time at the end of the braking stroke of the threaded rod, as the braking force is actually applied, the self-adjusting device does not become operative.

On the contrary, if at the end of the braking stroke the braking force is still not applied, the self-adjusting device allows the additional extraction of the threaded rod until the braking force is applied; that is, until the adjustment for the wear of the braking means is completed, but without adjusting for any elastic play or give.

The invention will now be described in detail, with reference to the attached drawings, supplied only as a nonlimiting example.

In the drawings, a pneumatic actuator assembly, generally designated 10, is shown for controlling a braking caliper (not shown) adapted to the wheel of a railway or similar type vehicle.

The actuator 10 consists essentially of a cylindrical tubular housing 12 with a cylinder 14 at one end which can be fed in a known method, such as, for example, by a source of compressed air.

Mounted in the cylinder 14 is a reciprocally movable, air-tight piston 18 operating against the action of compressed spiral spring 16, and having a hollow shaft 20 which extends inside the tubular housing 12.

Also attached to the housing 12 near the cylinder 14, is a connecting bushing 22, used with the brake arm attached to the actuator 10. The connecting bushing 22 projects inside the cavity of the tubular housing 12 and engages in a sliding manner, an axial plane 24 provided on the external surface of the hollow shaft 20. In this manner, the hollow shaft 20 does not rotate in relation to the tubular housing 12.

An externally threaded rod 26 extends coaxially inside the hollow shaft 20 with its external end projecting from the tubular housing 12, at the opposite side of the cylinder 14.

The thread of rod 26 is reversible. On the threaded rod 26 are engaged first an internally threaded ring 28 and then another internally threaded ring 30, axially separated from each other.

Threaded ring 28, which is placed in correspondence to the enlarged end 32 best seen in FIG. 2, of the hollow shaft 20, has on the side of the cylinder 14 a frontal toothed conical surface 34 facing a corresponding toothed frontal surface 36 on the enlarged end 32 of hollow shaft 20, and on the opposite end has an external circular relief 38. This relief 38 has a frontal toothing 40 interacting with a similar toothing 42 on a circular locator 44 which is axially mounted and sliding with respect to the enlarged end 32 of the hollow shaft 20 and nonrotating with respect to the hollow shaft 20 by a radial stop dowel 46 inserted in an axial slot 48 of enlarged end 32.

Between the inside end of enlarged end 32 and the surface of the circular locator 44 opposite the toothing 42 there is a spiral compression spring 50.

A flexible sleeve 52 is coaxially inserted in the enlarged end 32 between the circular threaded ring 28 and the circular threaded ring 30, with its extremity facing the cylinder 14 and resting, through a rotating axial bearing 54, against the shoulder 38 of the circular threaded ring 28. The wall of the sleeve 52 is subdivided into a series of axial strips 56, the free ends of which have conical outer surfaces 58 and knurled inner surfaces 60.

The outer conical surfaces 58 of the strips 56 face a complementary circular conical end surface 62 of a bushing 64 coaxially inserted in enlarged end 32 with its opposite end resting against the circular stop 44.

A spiral compression spring 66 is inserted between an elastic stop ring 68 carried by the free end of enlarged end 32 of the hollow shaft 20 and the free ends of the elastic strips 56 of the elastic sleeve 52, with the interposition of ring 70. The free ends of the elastic strips 56 of the sleeve 52 surround the end 72 of a friction bushing 74 which slides with friction, with respect to the threaded rod 26 and surrounds with clearance, the second circular internally threaded ring 30. The end 72 has a conical and toothed inside frontal surface 76 able to work together with a complementary frontal toothed surface 78 of the circular threaded ring 30.

The opposite end of the friction bushing 74 has the enlarged end section 80 placed between a fixed circular stop 82, which is integral with the tubular housing 12, and a movable circular stop 84 through which the threaded rod 26 passes. The movable stop 84 is normally held against a retaining ring 86, which is an integral part of housing 12, by the action of two spiral compression springs 88 placed between the stop 84 and the end 90 of the tubular housing 12 opposite the cylinder 14.

The travel of the end 80 of bushing 74 between the fixed stop 82 and the movable stop 84, labeled A in the drawing, corresponds, as shown below, to the normal braking stroke of actuator 10.

The end 80 of bushing 74 has front teeth 98 which interact with the complementary front toothing 100 on the fixed stop 82.

The toothed surface 78 of the second circular threaded ring 30 is normally engaged with the toothing 76 of the bushing 74 by the action of spiral compression spring 92 inserted between the end of threaded ring 30, opposite toothing 78, and the flexible retaining ring 94, by a rotating axial bearing 96, on the end 80 of the bushing 74.

The friction bushing 74 together with the second circular threaded ring 30 forms an adjusting device R which, as will be explained hereinafter, will continuously take up play due to the wear of the friction pads of the braking caliper on the end of the actuator 10.

The elastic sleeve 52 with bushing 74 and spring 66 constitutes a disengaging device F which works with an actuator assembly $S_2$ formed by the first threaded ring 28 with a positive clutch 34, and 40, 42 and also by the spring 50, and with an engaging device $S_1$, consisting of a movable stop 84 and a spring 88, to prevent during the braking, as will become clear hereinafter, adjustments being made for the elastic play in the mechanism connecting the actuator 10 and the friction pads associated with it.

The threaded rod 26, at the end opposite of piston 18, has a reduced portion 102 with an initial groove part 104 and a smooth terminal portion 106. Connected on the grooved side 104 is a grooved hub 108 of a sleeve 110 which has, corresponding to the tubular housing 12, a series of axial stop teeth 112. In addition, firmly affixed to the sidewall of the sleeve 110 is the outer end of a tubular guard 114 sliding telescopically along the outer surface of the tubular housing 12.

Numeral 116 indicates a part that is attached to the end of the device with a tubular part 118 installed on the smooth terminal part 106 of the lower end 102 of the threaded rod 26 and clasped axially with respect to the lower end by a ring nut 120. The tubular part 118 is inserted coaxially in the cavity of the sleeve 110, and between these two elements is placed an axial rotating bearing 122 which allows the free rotation of the sleeve 110 with respect to the element 116.

A transversal connecting bushing 124, like the connecting bushing 22, is firmly fixed to element 116 and used to connect the other arm of the braking caliper. In addition, part 116 is equipped with a draw-bar element, indicated with 126, which has the function of preventing the rotation of the sleeve 110, and therefore the threaded rod 26, with respect to part 116.

Actually, the draw-bar element 126 is formed by a pin-type spring wrapped around a cylindrical support 128, fixed transversally to part 116, and which has an arm 126a resting against the outer surface of the connecting bushing 124.

The other arm 126b of the draw-bar element 126 is axially extended through a recess 130 made at the top of part 116 and engages the frontal teeth 112 of the sleeve 110.

Associated with arm 126b is a control element 132, formed by a block 134 sliding into the recess 130 and crossed by arm 126b of the spring 126, to which is anchored a maneuvering rod 136.

It is evident that pulling toward the outside of the tie-rod 136 causes the raising of the elastic arm 126b of draw-bar element 126 and consequently the disengaging of the sleeve 110 in relation to the frontal stop toothing 112.

The actuator of the present invention operates in the following manner:

By admitting compressed air into the cavity of the cylinder 14, the shifting of the piston 18 is effected. At the same time, the shifting of the tubular shaft 20 toward the right side with reference to the drawing, and of the threaded rod 26, along with the first threaded circular ring 28, the flexible sleeve 52, the bushing 74 and of the second circular threaded ring 30 occurs. The action of the above-mentioned shifting, starts from the separation between end 80 of the bushing 74 and the fixed stop 82 with the consequent disengagement of the toothed coupling 98–100, to the contact between this end 80 and the movable stop 84.

If there is no play due to the wear of the friction pads of the braking caliper, at the end of the braking stroke A, the complete rotation of the arm of the brake calipers, and therefore the application of the friction pads against the wheel, is obtained, with the consequent application of the braking force. In this state, the toothed couplings 40–42 and 76–78 are engaged, while the toothed couplings 34–36 and 98–100 are disengaged.

Should the pressure on the piston 18 increase, the spring 50 will be compressed and consequently the toothing 34 of the first circular threaded ring 28 will engage with the toothing 36 of the tubular shaft 20, while maintaining the coupling between the toothing 40 and 42. In this case, the action of spring 66 will cause the flexible sleeve 52 to back up and to contract radially, due to the sliding between the conic surfaces 58 and 62, and the consequent clasping of the clutch bushing 74 by the elastic strips 56. Consequently, the bushing 74 and the second circular threaded ring 30 are made integral to the threaded rod 26, i. e., nonrotatable, and to tubular shaft 20, therefore causing the movable stop 84 to move by the compression of the spring 88.

In this case, there is no appreciable variation in the relative position between the threaded rod 26 and the tubular shaft 20, in spite of the absence of flexible play in the mechanism connecting the actuator 10 and the braking caliper since the engaging device F prevents the adjusting device R from acting when the braking force is applied.

By connecting the cylinder 14 to the discharge, the spring 16 moves back the piston 18 and therefore the threaded rod 26, to the other components of the actuator 10 in the original starting position, therefore interrupting the braking action.

If at the moment of the braking stroke there is a play due to the wear of the friction pads of the braking caliper, the operation of the actuator, as described in the invention, is as follows:

Due to the admission of compressed air in cylinder 14, the piston 18 with the tubular shaft 20 and the threaded rod 26 moves as described above, until the completion of stroke A, and therefore until the end 80 of the bushing 74 contacts the movable stop 84.

Now the braking pads are not yet in contact with the wheel, because of the play due to their wearing. Consequently, piston 18 with the tubular shaft 20 move together with the threaded rod 26, the first circular threaded ring 28, the flexible sleeve 52 and the second circular threaded ring 30, while the friction bushing 74 is abutted against the movable stop 84.

Consequently, the toothings 76 and 78 separate and are immediately reengaged by the flexible reaction of the spring 92 which is compressed. In this manner, the second circular threaded ring 30 moves on the threaded rod 26 and causes a variation of the position between the threaded rod 26 and the bushing 74 until the adjustment of play due to the wear of the friction pads is complete.

Now the braking pads are brought near the wheel, applying the braking force, while the intervention of the engaging device F prevents the adjustment of any possible play existing in the transmission between the actuator 10 and the braking calipers.

In fact, when the brake is applied, the spring 50 placed between the tubular shaft 20 and the first circular threaded ring 28 gives, causing the coupling between the toothing 34 and 36 and the clasping of the elastic sleeve 52 on the bushing 74, under the action of the spring 66. Consequently, as before, the bushing 74 becomes integral to the threaded rod 26, causing the movable stop 84 to move forward for the relaxation of the spring 88.

In other words, also in this case engaging device F is activated by group $S_2$ and prevents appreciable variations of position between the threaded rod 26 and the tubular shaft 20 which may appear due to the adjusting of elastic play in the transmission mechanism between the actuator 10 and the braking caliper. The action of the engaging device $S_1$, with the motion toward the stop 84, allows the threaded rod 26 to complete the braking stroke.

Therefore, while the normal play due to wear of the friction pads is automatically adjusted during each braking cycle by placing the threaded rod 26 in a different axial position shifted toward the outside with respect to the tubular shaft 20, there is no adjustment of the play elastic give.

If it is necessary to change the braking pads of the caliper, the threaded rod 26 must be placed back into the axial position completely inserted with respect to the tubular shaft 20.

To do so it is sufficient to freely rotate the sleeve 110 with respect to part 116. This is accomplished by disengaging the arm 126b of draw-bar element 126 with respect to the toothed front 112 through the engaging element 132.

Due to this disengagement threaded rod 26 is free to rotate and by an axial thrust given from the outside of part 116, it is possible to turn the threaded rod 26 with respect to the circular threaded element 28, thereby returning threaded rod 26 to the position illustrated in the drawing.

Of course, even though the principle of the invention remains unchanged, the format and particulars of each application can vary widely when compared to what has been described and illustrated, and thus without going beyond the scope of the claims for the present invention.

I claim:

1. A railway brake slack adjusting apparatus, said apparatus comprising:
   (a) a tubular housing member;
   (b) a cylinder connected to one end of said tubular housing;
   (c) a piston slidably mounted in said cylinder responsive to fluid pressure in a brake application direction and to an elastic retraction means in a brake release direction;
   (d) a hollow shaft engageable with said piston in a nonrotatable manner with respect to said tubular housing;

(e) a threaded rod member at least partially extending coaxially within said tubular housing member;

(f) a first rotatable member having a threaded portion engaging said threaded rod member for varying the relative position of said threaded portion with respect to said threaded rod member;

(g) a first abutment surface carried by a movable member engageable with a mating abutment surface carried by said first rotatable member;

(h) a second rotatable member threadedly engaging said threaded rod member and disposed adjacent said hollow shaft for selectively coupling said hollow shaft to said threaded rod member and for varying the relative axial position between said hollow shaft and said threaded rod member; and (i) a flexible locking means disposed between said first rotatable member and said second rotatable member for limiting relative movement between said threaded portion and said threaded rod member when a predetermined force is transmitted through said second rotatable member, said flexible locking means including a radially flexible clamping means for engaging a portion of said first rotatable member and retarding rotation of said threaded portion.

2. A railway brake slack adjuster, according to claim 1, wherein said predetermined force transmitted through said second rotatable member corresponds to an elastic take-up in such railway brake's brake rigging.

3. A railway brake slack adjuster, according to claim 1, wherein said radially flexible clamping means includes a flexible sleeve.

4. A railway brake slack adjuster, according to claim 3, wherein said radially flexible clamping means further includes a bushing engaging said flexible sleeve.

5. A railway brake slack adjuster, according to claim 4, wherein said flexible sleeve and said bushing include angular mating engagement surfaces.

6. A railway brake slack adjuster, according to claim 1, wherein said movable member includes a friction bushing and wherein said first rotatable member engaging said threaded rod member is a threaded nut.

7. A railway brake slack adjuster, according to claim 6, wherein said slack adjuster further includes at least one fixed stop means and at least one movable stop means each of which is engageable by said friction bushing.

8. A combination vehicular brake actuating and slack adjusting apparatus, said apparatus comprising:

(a) a tubular housing;

(b) a cylinder connected to one end of said tubular housing;

(c) a piston slidably mounted in said cylinder responsive to fluid pressure in a brake application direction and to an elastic retraction means in a brake release direction;

(d) a hollow shaft engageable with said piston in a nonrotatable manner with respect to said tubular housing;

(e) a threaded rod axially positioned with respect to said hollow shaft and in a nonrotatable manner with respect to said tubular housing for operating such vehicle brake;

(f) a coupling means position between said threaded rod and said hollow shaft for axially coupling said threaded rod to said hollow shaft, said coupling means including:

(i) an abutment surface carried by said hollow shaft; and (ii) a first rotatable member threadedly engaged with said threaded rod and having an abutment surface for matingly engaging said abutment surface carried by said hollow shaft;

(g) a clutch means engagable with said threaded rod for adjusting during a brake application play due to brake shoe wear by varying the axial position between said threaded rod and said hollow shaft, said clutch means including;

(i) a rotatable member having an abutment surface and the threaded portion, said threaded portion threadly engaging said threaded rod; and (ii) an abutment surface carried by a movable member for matingly engaging said abutment surface carried by said rotatable member, said movable member including a bushing positioned to slide on said threaded rod on said rotatable member screwed on said threaded rod and surrounded with play by said bushing, said bushing carrying at one end a locator positioned to engage with a pair of stops in said tubular housing which limits the normal brake stroke of said threaded rod and wherein one of said pair of stops corresponding to the end of the stroke is slidable against the action of an elastic retraction means in relation to said tubular housing during the supplementary stroke of said threaded rod when said clutch is engaged, the other end of said bushing includes a frontal coupling side which interacts with the frontal supplementary coupling surface of said threaded element which stops its rotation in accordance to said threaded rod under the action of an elastic means which can be compressed by the action of the axial separation between said coupling parts at the end of the normal brake stroke of said threaded rod in the absence of the application of the brake;

(h) a flexible engaging means positioned adjacent said coupling means and said clutch means for engaging said clutch means during a brake stroke, said flexible engaging means including a clasping element able to axially clasp said bushing with respect to said threaded rod after the action of said engaging device; and (i) means engageable by said movable member to allow a supplementary brake stroke of said threaded rod integral with said hollow shaft.

9. A brake actuating and slack adjusting apparatus, according to claim 8, wherein said coupling means including said rotatable member screwed on said threaded rod which is engaged by said hollow shaft against the action of a flexible retraction means, after the application of the brake, to activate said flexible engaging means.

10. A brake actuating and slack adjusting apparatus, according to claim 9, wherein said flexible engaging means is formed by a sleeve which surrounds with play said bushing and has clasping parts radially retractable by the action of an elastic retraction means and by tapered surfaces able to work together with tapered complementary surfaces of said hollow shaft.

11. A brake actuating and slack adjusting apparatus, according to claim 10, wherein said apparatus further includes a manually controlled disengaging means associated with the free end of said threaded rod to enable rotation of said threaded rod with respect to said tubular housing.

* * * * *